United States Patent Office 3,331,799
Patented July 18, 1967

3,331,799
FIBROUS GLASS BINDER
Joseph P. Stalego, Newark, Ohio, assignor to Owens-Corning Fiberglas Corporation, a corporation of Delaware
No Drawing. Filed Nov. 2, 1964, Ser. No. 408,338
3 Claims. (Cl. 260—29.6)

This invention relates to an improved binder composition for use with glass or vitreous fibers in mat form. More specifically, the binder is a water dispersion of a vinyl polymer, which dispersion is characterized by its unusual ability to flow freely and uniformly throughout the mat of fibers and form a bonded structure thereof.

Bonded mats and boards of intermeshed glass fibers have been produced commercially for many years. Several processes have been used to manufacture mats of continuous or discontinuous filaments. The attenuation of glass streams into fibers utilizes forces derived from mechanical pulling, steam blasts, burner blasts, centrifugal or rotary motion, fluid jets or various combinations of these. Regardless of the attenuation force utilized, the filaments, fibers, strands or mixtures are collected in tangled, intermeshed, web-like masses on a suitable collection device such as a foraminous conveyor. The collected fibers are then impregnated by immersion, dipping, flooding, roll coating or spraying, or the like with a binder to provide integrity to the mat. The binder is dried, cured or set-up by removing water, squeezing, compressing, molding, heating or cooling as required.

Mats, so produced, are used to provide decorative or protective surfaces for structures such as glass fiber boards and the like or the mats are used as reinforcements or laminating sheets which are combined with various organic and inorganic materials such as resins, elastomers, cements and the like.

Binder formulations for these mats are generally aqueous dispersions which are desirable for their ease of application, lack of fire hazard, relative low cost and excellence of binding action. Control of binder solids and amount of dispersion applied and retained on the mat are maintained to provide satisfactory results and uniformity of product.

The binder utilized on surfacing mats for acoustical boards, form boards and structural boards must bind the fibers of the mat, must be compatible with the fibers and treating materials on the fibers in the boards with which the mat is combined, and must provide a satisfactory appearance.

Binders for surfacing mats must be dust free and must eliminate fuzz present in poorly bonded mats. Fuzz consists of short fibers, loose fibers, broken fibers and filaments which project from the mat. The amount of fuzz is controlled by the application of a proper binder. When no fuzz is present, the collection of dirt and dust on the surface of the mat and on boards which the mats cover is very materially reduced.

It is an object of this invention to provide an improved binder composition for bonded glass fiber mat.

It is also an object to provide a method of producing an improved binder composition.

It is a further object to provide a superior glass fiber mat comprising fibers bonded with an improved binder composition.

Other objects will be apparent from the following description and claims.

An improved binder comprises a cementing constituent capable of bonding the fibers together and forming a film on and between fibers, a water soluble thermopastic resin polymer used as a thickener, pigment to provide the desired appearance, and when necessary an anti-foaming agent, a fungicide and a dispersant, all in an aqueous dispersion applicable to glass fibers in mat form.

A suitable anti-forming agent may be added if desired. For instance, one of the surface-active materials (a blend of processed saturated fats of predominantly sulfated high melting point derivatives or a blend of nonionic and anionic materials produced from saturated fatty derivatives) successfully used in the preparation of latex paints to minimize air-entrapment by coalescence of bubbles may be utilized. This ingredient is not critical and may be omitted when foaming is not considered a critical problem.

An example of an improved binder in accordance with this invention comprises the following:

*Example I*

| Ingredient: | Parts by weight |
|---|---|
| Water | 792 |
| Ammonium hydroxide, 28% | 3.8 |
| Titania pigment | 150 |
| Aluminum silicate (clay) | 100 |
| Isooctyl phenyl polyethoxy ethanol (liquid) | 2 |
| Ethylene oxide polymer MW 4,000,000 | 8 |
| Polyvinyl chloride latex (55% solids) (257 solids) | 467 |
| 6-bromo-5-chlorobenzoxazolone | 4 |

The ingredients are added to the mixing tank, in the order given, under constant agitation. After the isooctyl phenyl polyethoxy ethanol is added, the temperature of the mixture is raised to 130° F. and the gelling agent, polyvinyl chloride and fungicide are added in this order. The amount of water is adjusted, if necessary, to obtain 39% by weight solids. If gelation or build-up of binder appears on the agitator shaft, sufficient dispersant (isooctyl phenyl polyethoxy ethanol) is slowly added to redisperse the binder. The polyvinyl chloride is a vinyl resin preplasticized with 35% dioxtyl phthalate and prepared in the form of a 55% solids latex in water.

The improved binder composition for bonded fibrous mat comprises an aqueous formulation having a solids content of from about 18% to about 45%. The binder of Example 1 comprises, by weight, about 0.4% of isooctyl phenyl polyethoxy ethanol as a dispersant, about 47.3% of pigment, about 1.5% of an ethylene oxide polymer having a molecular weight of about 4,000,000 which tends to thicken or gel the binder and promotes film forming and yet allows free flow through the mat of fibers, about 1.1% of 28% ammonium hydroxide (7.5 pounds per gallon solution) to disperse the pigment and clay, about 48.8% of polyvinyl chloride, and a fractional percent of a fungicide.

The binder is used as follows. Water is sprayed onto the mat as it is formed. The Example 1 binder is about 39% by weight solids, as applied, but it is diluted by the water applied to the fibers and the mat being formed so that the final solids of the binder is from about 4% to 7% by weight. Sufficient binder is applied to the mat so that the ignition loss of the mat product is from about 17% to 23%. The organic materials only are removed during the ignition loss determination. The inorganic pigment which makes up roughly half of the binder solids will remain on the product after the ignition loss determination.

The binder solids of the various binders of this invention comprise from 0.2% to 50% pigment, from 5% to 55% clay, from 20% to 80% polyvinyl chloride latex and a small amount of a thickener such as a water soluble, thermoplastic, high molecular weight ethylene oxide polymer. The high molecular weight ethylene oxide polymer acts as a thickener in the aqueous dispersion of binder solids. For instance, an ethylene oxide polymer having an approximate molecular weight of 4,000,000 is added in sufficient quantity to provide from about 0.5% to 2.5% by weight of the polymer based upon the total binder solids in the mix. The ethylene oxide polymer promotes complete and uniform distribution of the binder through the fibrous mat.

Various vinyl polymers can be used as an essential ingredient for these binders.

The vinyl chloride polymer acts as a binding agent or cementing agent to adhere fibers together at their points of contact within a mat. The vinyl resin is added as a latex, a water dispersion of resin solids in water. The resin utilized is one which has been preplasticized during manufacture with 35 parts of dioctyl phthalate per 100 parts of resin. The spherical resin solids are then dispersed in water to form a colloidal mixture of vinyl chloride polymer and water.

The pigment utilized in these mixtures may be any suitable pigment which is dispersable in aqueous mixtures. Pigment is added to achieve the desired color in the mat product. Titania and various inorganic oxides are quite suitable to provide color and hiding power to the binder mixes when applied to glass fiber mats.

Clay or any other form of finely divided aluminum silicate is used as a filler to give body and hiding power to the binder when applied and hardened or dried on the mats of glass fibers.

clay and pigment are important properties since the binder and the mat function as a decorative surface coating for the mineral fiber board. The surfacing mat was secured to the fibrous glass board by a polyvinyl acetate adhesive which is applied to the board before the mat is applied thereto.

It has been discovered that the improved binder compositions disclosed herein provide a fuzz-free surface which makes the collection of air-borne dust non-existent. In addition, the compositions flow freely through the mat of fibers to provide a uniform distribution of binder and correlated uniform appearance throughout the extent of the mat.

Additional compositions have been prepared in substantially the same manner in which the binder of Example I was prepared. The amounts of the constituents were varied as indicated in the following table. The constituents were added in the descending order of the list and in the amounts indicated with constant agitation and thorough mixing during and after the addition of each ingredient. The polyvinyl chloride is preferably added as a latex which comprises resin solids dispersed in water, in which case the water of the latex replaces a part of the indicated water portion.

DE LUXE MAT BINDER EXAMPLES

| Example | 2 | 3 | 4 | 5 | 6 | 7 | 8 | 9 |
|---|---|---|---|---|---|---|---|---|
| Percent Solids | 39 | 33 | 25 | 20 | 39 | 33 | 25 | 20 |
| Water | 834 | 1,254 | 1,240 | 2,696 | 812 | 1,257 | 1,240 | 2,714 |
| NH$_4$OH, 28% | 3.75 | 4.0 | 3.5 | 6.0 | 3.75 | 3.75 | 3.75 | 3.75 |
| Pigment | 150 | 250 | 50 | 50 | 1.7 | 2.5 | 1.0 | 4.0 |
| Clay (aluminum silicate) | 100 | 100 | 100 | 350 | 250 | 350 | 150 | 400 |
| Isooctyl phenyl polyethoxy ethanol (liquid) | 2.0 | 2.0 | 2.0 | 2.0 | 2.0 | 2.0 | 2.0 | 2.0 |
| Ethylene oxide polymer | 8.0 | 8.0 | 4.0 | 12.0 | 8.0 | 8.0 | 4.0 | 12.0 |
| Polyvinyl chloride solids | 258 | 257 | 258 | 258 | 258 | 257 | 258 | 258 |
| 6-bromo-5-chlorobenzoxazolone | 4.0 | 5.0 | 3.0 | 6.0 | 4.0 | 5.0 | 3.0 | 6.0 |

NOTE.—All proportions other than percent solids expressed in pounds.
The pigment of Examples 6, 7, 8 and 9 is red iron oxide which provides a pink cast to the mat.

Bonded mats of fibrous glass were produced using the hardenable binder compositions disclosed. Steam blown fibers averaging about 0.006 inch in diameter and in random lengths from one inch to more than a foot were produced and co-deposited with water upon a foraminous conveyor in the form of a mat. The mat was flooded with the binder composition by freely flowing the binder on the top of the mat and excess water and binder was removed from the mat by a suction box at the underside of the conveyor. The water and binder removed from the mat is recirculated after solids adjustment along with fresh binder which is added, as required, to the binder supply. The mat was then cured at a temperature of from 280° F. to 350° F. after the initial water was removed at the entrance end of the oven which was maintained at about 600° F.

The resulting mat, after cure of the binder, consisted of about 60% by weight of glass fibers and 40% by weight of cured binder and had an apparent density of three and one-half pounds per cubic foot. The ignition loss of the mat was 30%.

Mats of glass fibers bonded with the compositions of the present invention are used to surface fibrous glass boards sometimes referred to as form boards, panel boards and the like for construction purposes. The binder and the surfacing mat upon which the binder is applied serve a dual function. The binder makes an integral mat of the haphazardly arranged fibers of the mat and at the same time provides color and a decorative appearance to the mat and thus to the board which the mat covers. The bonded fibers when used as a surfacing mat for a mineral fiber board provides a strong puncture-resistant, dust-less surface and at the same time provides a decorative appearance. The hiding power and color provided by the Examples 1–5 are applied to deluxe mats and Examples 6–9 are applied to industrial mats.

The formulations set forth have provided the following improvements:

(1) Fuzz has been eliminated with attendant improvement in appearance and reduction of dust and dirt collection.

(2) Filming characteristics of the binder are excellent resulting in good bond of fiber to fiber.

(3) Very good flow and uniform distribution of the binder through the mat has been achieved.

(4) Improved appearance and good hiding power are provided by dried deposits of these binder compositions on surfacing mats.

(5) The elimination of phenolic resin from these binders improved the resistance to combustion.

Various modifications may be made within the spirit and scope of the appended claims.

I claim:

1. Method for preparing a decorative binder for glass fibers comprising forming a mixture by dispersing pigment in water along with the addition of a sufficient amount of ammonium hydroxide to facilitate dispersion of the pigment, dispersing clay into the mixture along with an addition of sufficient amount of isooctyl phenyl polyethoxy ethanol to facilitate dispersion of the clay and pigment and to act as an anti-gelling agent, heating the mixture to about 130° F., dispersing an ethylene oxide polymer having a molecular weight of about 4,000,000 in the mixture, and adding to the mixture a 55% solids polyvinyl chloride latex, and wherein the proportions of the ingredients are such that the binder composition has a solids content by weight of from 20 to 80% polyvinyl chloride, from 0.2 to 50% pigment, from 5 to 55% clay, and from 0.5 to 2.5% ethylene oxide polymer.

2. Method of producing a bonded mat of mineral fibers which includes saturating a mat of haphazardly arranged fibers with water and simultaneously applying an aqueous binder composition consisting of an 18 to 45% solids dispersion wherein the solids consist essentially of from 20 to 80% polyvinyl chloride, from 0.2 to 50% pigment, from 5 to 55% clay and from 0.5 to 2.5% of an ethylene oxide polymer having a molecular weight of 4,000,000, said dispersion including sufficient isooctyl phenyl polyethoxy ethanol to facilitate dispersion of the clay and pigment and to act as an anti-gelling agent to retain applicability of the binder composition, removing excess water and binder, and heating at least the binder composition to remove the remaining water and cause the binder to harden upon the mineral fibers to form the bonded mat.

3. The process of claim 2 wherein sufficient binder is applied to the mineral fibers so that the ignition loss of the bonded mat is from about 17 to 23%.

References Cited

UNITED STATES PATENTS

| | | | |
|---|---|---|---|
| 2,688,007 | 8/1954 | Steinman | 260—29.6 |
| 3,006,872 | 10/1961 | Benedict et al. | 260—899 |
| 3,117,942 | 1/1964 | Kingston et al. | 260—29.6 |
| 3,274,136 | 9/1966 | Glesner et al. | 260—29.6 |

FOREIGN PATENTS 144,836   1/1952   Australia.

MURRAY TILLMAN, *Primary Examiner.*

J. WHITE, *Assistant Examiner.*